(12) United States Patent
Robinson et al.

(10) Patent No.: US 6,901,483 B2
(45) Date of Patent: May 31, 2005

(54) PRIORITIZING AND LOCKING REMOVED AND SUBSEQUENTLY RELOADED CACHE LINES

(75) Inventors: John T. Robinson, Yorktown Heights, NY (US); Robert B. Tremaine, Stormville, NY (US); Michael E. Wazlowski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 10/279,246

(22) Filed: Oct. 24, 2002

(65) Prior Publication Data

US 2004/0083341 A1 Apr. 29, 2004

(51) Int. Cl.[7] .............................................. G06F 12/00
(52) U.S. Cl. ...................... 711/133; 711/128; 711/134; 711/136; 711/144; 711/158; 711/159
(58) Field of Search ................................ 711/133, 159, 711/144, 134, 128, 136, 158

(56) References Cited

U.S. PATENT DOCUMENTS

| | | | | |
|---|---|---|---|---|
| 5,353,425 A | * | 10/1994 | Malamy et al. ............. | 711/144 |
| 5,555,400 A | * | 9/1996 | Groves et al. ............. | 711/165 |
| 5,584,013 A | * | 12/1996 | Cheong et al. ............. | 711/122 |
| 5,913,224 A | * | 6/1999 | MacDonald ................. | 711/125 |
| 6,044,430 A | * | 3/2000 | MacDonald ................. | 710/260 |
| 6,047,358 A | * | 4/2000 | Jacobs ........................ | 711/133 |
| 6,243,788 B1 | * | 6/2001 | Franke et al. ................ | 711/3 |
| 6,490,654 B2 | * | 12/2002 | Wickeraad et al. ......... | 711/133 |
| 2001/0001873 A1 | * | 5/2001 | Wickeraad ................... | 711/136 |
| 2004/0044847 A1 | * | 3/2004 | Ray et al. .................... | 711/122 |

* cited by examiner

*Primary Examiner*—Stephen Elmore
(74) *Attorney, Agent, or Firm*—McGinn & Gibb, PLLC; Derek S. Jennings, Esq.

(57) ABSTRACT

A method for selecting a line to replace in an inclusive set-associative cache memory system which is based on a least recently used replacement policy but is enhanced to detect and give special treatment to the reloading of a line that has been recently cast out. A line which has been reloaded after having been recently cast out is assigned a special encoding which temporarily gives priority to the line in the cache so that it will not be selected for replacement in the usual least recently used replacement process. This method of line selection for replacement improves system performance by providing better hit rates in the cache hierarchy levels above, by ensuring that heavily used lines in the levels above are not aged out of the levels below due to lack of use.

20 Claims, 6 Drawing Sheets

| MRU 300 | | | LRU 301 |
|---|---|---|---|
| 0 | 1 | 2 | 3 |
| 0 | 1 | 3 | 2 |
| 0 | 2 | 1 | 3 |
| 0 | 2 | 3 | 1 |
| 0 | 3 | 1 | 2 |
| 0 | 3 | 2 | 1 |
| 1 | 0 | 2 | 3 |
| 1 | 0 | 3 | 2 |
| 1 | 2 | 0 | 3 |
| 1 | 2 | 3 | 0 |
| 1 | 3 | 0 | 2 |
| 1 | 3 | 2 | 0 |
| 2 | 0 | 1 | 3 |
| 2 | 0 | 3 | 1 |
| 2 | 1 | 0 | 3 |
| 2 | 1 | 3 | 0 |
| 2 | 3 | 0 | 1 |
| 2 | 3 | 1 | 0 |
| 3 | 0 | 1 | 2 |
| 3 | 0 | 2 | 1 |
| 3 | 1 | 0 | 2 |
| 3 | 1 | 2 | 0 |
| 3 | 2 | 0 | 1 |
| 3 | 2 | 1 | 0 |

FIG.3

PRIOR ART

| MRU | | | LRU |
| --- | --- | --- | --- |
| 0 | 1 | 2 | 3 |
| 0 | 1 | 3 | 2 |
| 0 | 2 | 1 | 3 |
| 0 | 2 | 3 | 1 |
| 0 | 3 | 1 | 2 |
| 0 | 3 | 2 | 1 |
| 1 | 0 | 2 | 3 |
| 1 | 0 | 3 | 2 |
| 1 | 2 | 0 | 3 |
| 1 | 2 | 3 | 0 |
| 1 | 3 | 0 | 2 |
| 1 | 3 | 2 | 0 |
| 2 | 0 | 1 | 3 |
| 2 | 0 | 3 | 1 |
| 2 | 1 | 0 | 3 |
| 2 | 1 | 3 | 0 |
| 2 | 3 | 0 | 1 |
| 2 | 3 | 1 | 0 |
| 3 | 0 | 1 | 2 |
| 3 | 0 | 2 | 1 |
| 3 | 1 | 0 | 2 |
| 3 | 1 | 2 | 0 |
| 3 | 2 | 0 | 1 |
| 3 | 2 | 1 | 0 |
| L0_0 | 1 | 2 | 3 |
| L0_0 | 1 | 3 | 2 |
| L0_0 | 2 | 1 | 3 |
| L0_0 | 2 | 3 | 1 |
| L0_0 | 3 | 1 | 2 |
| L0_0 | 3 | 2 | 1 |

| MRU | | | LRU |
| --- | --- | --- | --- |
| L0_1 | 1 | 2 | 3 |
| L0_1 | 1 | 3 | 2 |
| L0_1 | 2 | 1 | 3 |
| L0_1 | 2 | 3 | 1 |
| L0_1 | 3 | 1 | 2 |
| L0_1 | 3 | 2 | 1 |
| L0_2 | 1 | 2 | 3 |
| L0_2 | 1 | 3 | 2 |
| L0_2 | 2 | 1 | 3 |
| L0_2 | 2 | 3 | 1 |
| L0_2 | 3 | 1 | 2 |
| L0_2 | 3 | 2 | 1 |
| L0_3 | 1 | 2 | 3 |
| L0_3 | 1 | 3 | 2 |
| L0_3 | 2 | 1 | 3 |
| L0_3 | 2 | 3 | 1 |
| L0_3 | 3 | 1 | 2 |
| L0_3 | 3 | 2 | 1 |
| L0_4 | 1 | 2 | 3 |
| L0_4 | 1 | 3 | 2 |
| L0_4 | 2 | 1 | 3 |
| L0_4 | 2 | 3 | 1 |
| L0_4 | 3 | 1 | 2 |
| L0_4 | 3 | 2 | 1 |
| L0_5 | 1 | 2 | 3 |
| L0_5 | 1 | 3 | 2 |
| L0_5 | 2 | 1 | 3 |
| L0_5 | 2 | 3 | 1 |
| L0_5 | 3 | 1 | 2 |
| L0_5 | 3 | 2 | 1 |

PRIORITIZING AND LOCKING REMOVED AND SUBSEQUENTLY RELOADED CACHE LINES

BACKGROUND OF THE INVENTION

1. Field of the Invention

The present invention generally relates to the field of cache memory in computer systems, more specifically to an improved method and apparatus for determining which line to replace during cache line replacement in an inclusive set-associative cache memory system.

2. Description of the Related Art

Computer systems generally consist of one or more processors that execute program instructions stored within a memory medium. This medium is most often constructed of the lowest cost per bit, yet slowest storage technology. To increase the processor performance, a higher speed, yet smaller and more costly memory, known as a cache memory, is placed between the processor and final storage to provide temporary storage of recent/and or frequently referenced information. As the difference between processor speed and access time of the final storage increases, more levels of cache memory are provided, each level backing the previous level to form a storage hierarchy. Each level of the cache is managed to maintain the information most useful to the processor. Often more than one cache memory will be employed at the same hierarchy level, for example when an independent cache is employed for each processor.

Typically only large "mainframe" computers employ memory hierarchies greater than three levels. However, systems are now being created using commodity microprocessors that benefit greatly from a third level of cache in the memory hierarchy. This level is best positioned between the processor bus and the main memory. Since it is shared by all processors and in some cases the I/O system too, it is called a shared cache. Each level of memory requires several times more storage than the level it backs to be performance effective. Therefore, the shared cache requires several tens of megabytes of memory. To remain cost effective, the shared cache is implemented using relatively low cost Dynamic Random Access Memory (DRAM), yet at the highest performance available. This type of shared cache is typically accessed at a bandwidth that involves lengthy transfer periods, at least ten times that which is typical of other caches, to and from the main memory.

Caches have evolved into quite varied and sophisticated structures, but always they address the tradeoff between speed and both cost and complexity, while functioning to make the most useful information available to the processor as efficiently as possible. Since a cache is smaller than the next level of memory in the hierarchy below, it must be continuously updated to contain only information deemed useful to the processors.

There are two major types of cache organization: direct-mapped and set-associative. Direct-mapped caches are characterized by a one-to-one mapping from system address to cache address. This mapping can be as simple as using the lower n address bits of the system address as the cache address. Set-associative caches are characterized by a one-to-many mapping from system address to cache address. For example, in a four-way set-associative cache, the data corresponding to the system address can be found in one of four locations in the cache. There is a direct mapping from system address to set address but the tag, usually a subset of the upper system address bits, must be compared with the tags of each of the four ways of the set to determine which way contains the data. Which of the four possible addresses in the cache to select for a line which is a miss is based on a cache line replacement policy. The most widely used replacement policy is called least recently used (LRU). The idea behind LRU replacement is to replace the line that has been least recently used in the set. Accordingly, storage is required for each set in order to record how recently a line has been used. So, unlike direct-mapped caches, set-associative caches require extra storage, called a directory, to store address tags and replacement policy information such as LRU status. The higher hit rates of set-associative caches are usually worth the extra cost of having a directory.

A further property of cache hierarchies is called inclusion. In an inclusive cache hierarchy, every cache contains a subset of the data of the caches below it in the hierarchy. Cache levels above a given level are assumed to be closer to the processor whereas cache levels below a given level are assumed to be farther from the processor. Inclusive hierarchies allow cache coherence traffic to be filtered out at lower levels in the hierarchy and do not require they be propagated up to the highest level of the hierarchy. The filtering of cache coherence traffic helps improve memory system performance.

The locking of cache lines (that is pinning, or making lines not available for replacement) is known in the prior art. Examples include (1) U.S. Pat. No. 5,353,425, (2) U.S. Pat. No. 5,913,224, and (3) U.S. Pat. No. 6,047,358 each of which is incorporated herein by reference. However, prior art cache lines are locked under software control (as in the first and third references), or as part of system configuration in order to optimize access to real time data (as in the second reference). In contrast, in the current invention described below the locking (or pinning) of cache lines is done automatically by the cache controller when it is detected that a recently replaced line is reloaded into the cache.

Also known in the prior art is the concept of not replacing a line in a lower level cache when it is present in a higher level cache; an example is U.S. Pat. No. 5,584,013 incorporated herein by reference. However, efficient implementation of such schemes requires that the controller for the lower level cache have access to the directory information for the higher level cache. In systems such as those described above in which there is a large shared cache, accessing higher level cache directories on every cache line replacement in the shared cache is impractical. It is therefore an object of the current invention to retain cache lines that are frequently accessed in higher level caches in such a fashion that access to the directories of the higher level caches is not required when selecting a line to replace.

SUMMARY OF THE INVENTION

Computer memory systems that employ inclusive set-associative caches with LRU replacement policies have a potential inefficiency. Assume a multilevel cache hierarchy. A line in a cache level above the current level, where above means closer to the processor, may be used so often that an access to the same line in the current level will not occur for a long period of time. During the time the line is not being accessed in the current level, the line has the potential to be aged out of the cache by the LRU replacement policy. When the line is replaced in the current level, the inclusive nature of the cache hierarchy dictates the line must be evicted from all cache levels above the current level. Since the line is being accessed frequently in a level above the current level, upon completion of the eviction of the line, within a short period of time the upper cache level will request that the same line be written again into the upper cache levels. The eviction and subsequent fill in a short period of time of the same line is inefficient, causes lower cache hit rates, and causes the processor to stall while it waits for the line to be rewritten into the cache hierarchy. The inefficiency stems from the fact the current cache level is unaware the line is being accessed frequently in the levels above. The invention provides a method and an apparatus which allows the current cache level to detect the eviction and line fill (in a short period of time) of the same line. Once detected, the line is temporarily pinned in the current cache level. Since the line is pinned it will no longer be selected for replacement by the LRU policy and the inefficiency described above will be avoided.

The invention has a method for use in a computer system with a cache memory and a cache memory controller. The method detects when cache lines that have been recently replaced in the cache memory are subsequently reloaded into the cache memory and gives priority to the cache lines by the cache memory controller, so that while the cache lines have priority they are not selected for replacement on cache misses. The cache lines that have been recently replaced in the cache memory and then subsequently reloaded are detected by the use of timestamps and are also detected by the use of a FIFO array containing the addresses of recently replaced cache lines.

A cache line that has priority retains priority for a predetermined number of accesses to the cache set in which the cache line resides, after which the cache line again becomes eligible for replacement. A cache line that has priority also retains priority for a predetermined number of misses to the cache set in which the cache line resides, after which the cache line again becomes eligible for replacement.

The invention also identifies cache lines that are removed from and subsequently reloaded into a cache memory more recently than a predetermined reload standard as priority cache lines, and locks the priority cache lines to temporarily prevent the priority cache lines from being replaced on cache misses. The reloaded is a length of time, length of time of the FIFO table, etc.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
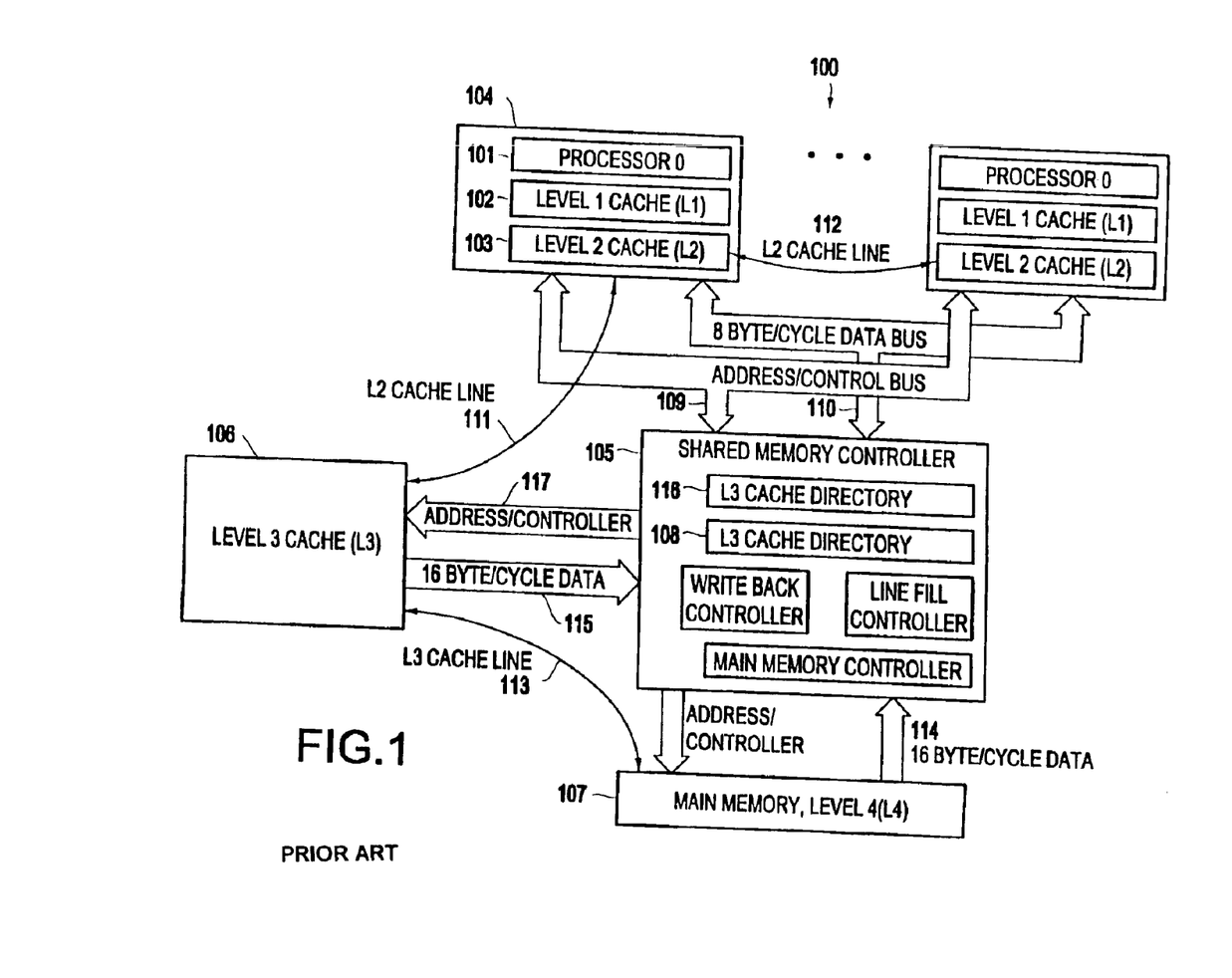
FIG. 1 illustrates a block diagram of a computer having a cache memory system.

Referring to FIG. 1, a block diagram of a prior art computer system 100 is shown. The computer system includes a one or more processors 101 with level 1 102 and level 2 103 local caches forming a processor node 104, each connected to a common shared memory controller 105 that provides access to the shared level 3 106 cache and associated directory 116, system main memory 107 representing the last level of a four level memory hierarchy. The cache control 108 is connected to the processor address bus 109 and to the data bus 110. The processor data bus is optimized and primarily used for transporting level 2 cache data lines between a level 2 cache and the level 3 111 and/or another level 2 cache 112. The main memory data bus 114 is optimized for, and primarily used for transporting level 3 cache data lines between the level 3 cache and the main memory 113. The level 3 cache data bus 115 is used for transporting both level 3 and level 2 data traffic, but is optimized for the level 3 cache data traffic. The level 3 cache 106 is both large and shared, and is typically constructed of the highest performance dynamic random access memory (DRAM) to provide enough storage to contain several times the collective storage of the local caches. The amount of main memory storage is typically over a thousand times that of the shared cache, and is implemented using inexpensive and often lower performance DRAM with processor access latencies much longer that the shared cache.

The processors 101 request read or write access to information stored in the nearest caches 102, 103 through a local independent address and data bus within the processor node 104. If the information is not available in those caches, then the access request is attempted on the processors independent address and data busses 109, 110. The shared memory controller 105 and other processor nodes 104 detect and receive the request address along with other state from the bus, and present the address to there respective cache directories. If the requested data is found within one of the neighboring processor nodes 104, then that node may notify the devices on the bus of the condition and forward the information to the requesting processor directly without involving the shared cache any further. Without such notification, the shared memory controller 105 cache controller 108 will simultaneously address the shared cache directory 116 and present the DRAM row address cycle on the cache address bus 117 according to the DRAM protocol. The next cycle the directory contents are compared to the request address tag, and if equal and the cache line is valid (cache hit), then the DRAM column address cycle is driven on the cache address bus 117 the following cycle to read or write access the cache line information. The shared memory controller acknowledges processor read requests with the requested data in the case of a cache hit, otherwise the request is acknowledged to indicate retry or defer to the processor, implying that a cache miss occurred and the information will not be available for several cycles.

Figure 2:
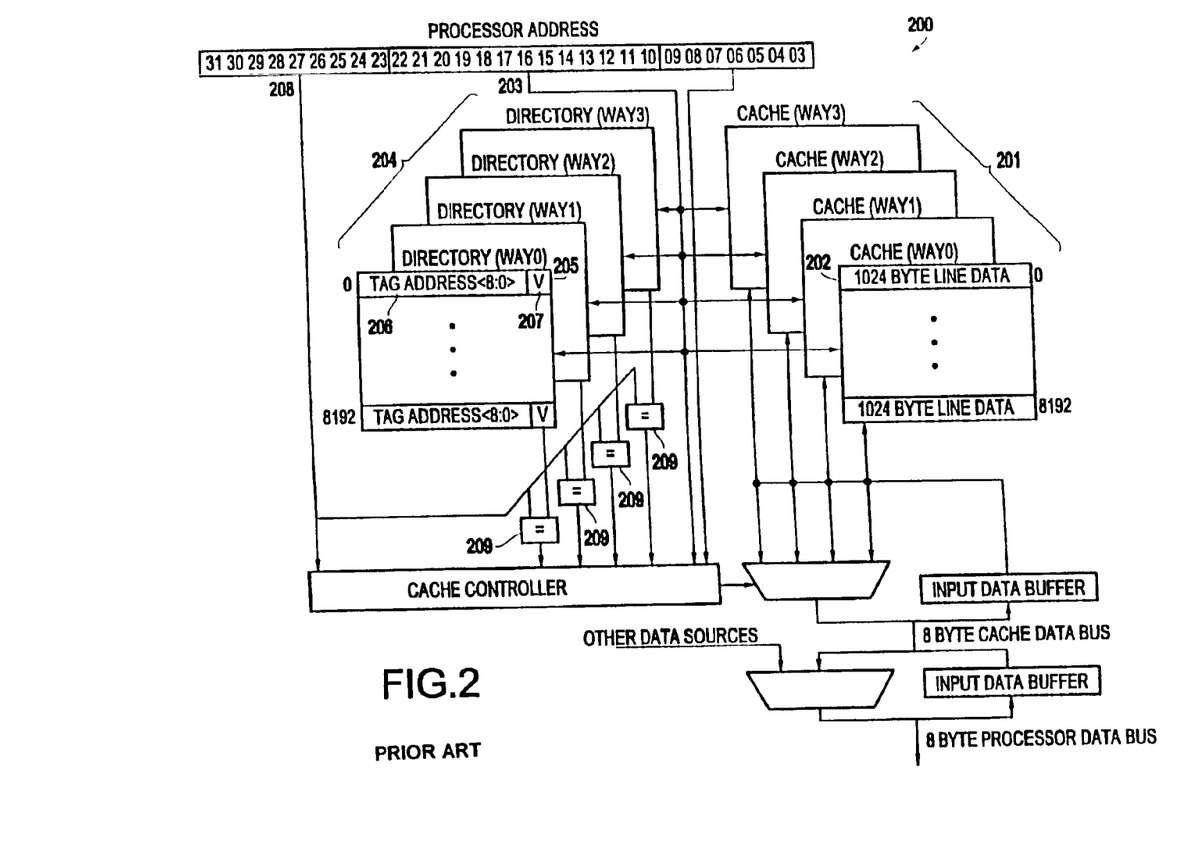
FIG. 2 illustrates a block diagram of a computer cache memory and cache directory.

Referring to FIG. 2, a 4-way set associative 32 MB shared cache system 200 employing 1024-byte cache lines is shown. The temporary information stored within the cache is constantly replaced with information deemed more valuable to the processor as its demands change. Therefore the cache array 201 is partitioned into an even number of storage units called lines 202. Each line is address mapped 203 to a group of equivalent sized ranges 208 within the main memory. A high speed directory 204 contains an entry 205, which is directly mapped to an index address 203 to each cache line, contains a tag address 206 to keep track of which main memory range is associated with the cache line contents, as well as independent bit(s) 207 to store state pertaining to the line contents. The directory entries and cache lines mapped at a given index address are grouped in a associative set of four to permit the storage of combinations of different tag addresses associated with the same index address. All four directory entries within a set are referenced in parallel for every processor request to determine which one of the four cache lines contains data for the request tag address.

When a processor requests information from an address within the main memory, the tag address stored within the mapped directory entries are compared 209 to the processor request address tag bits 208, and when equal and the state bit(s) indicating the information is valid 207, it is said that the cache has been hit. Upon determination of the hit condition, the cached information is returned to the processor. If there was no match for the tag address or the cache line was invalid, then the cache information would be retrieved from the next lower memory level. When the information becomes available, it is passed on to the requesting processor, as well as stored in to the cache 201 through a process called line fill. Often the cache line 202 is larger than the request information size, resulting in more information flow into the cache beyond that required to fulfill the request, and is called trailing line fill. Of course, if the cache was already full of valid information, then some existing information would have to be removed from the cache to make room for the new information through a process called line replacement. Cache line replacement involves either storing the new information over the existing information when the information is duplicated in a lower memory level or first removing the existing information and storing it back to a lower memory level through a process called line write back, because the information is not duplicated. In any case, a line fill always involves updating the associated directory entry with the new tag address and relevant state bits.

Figure 3:
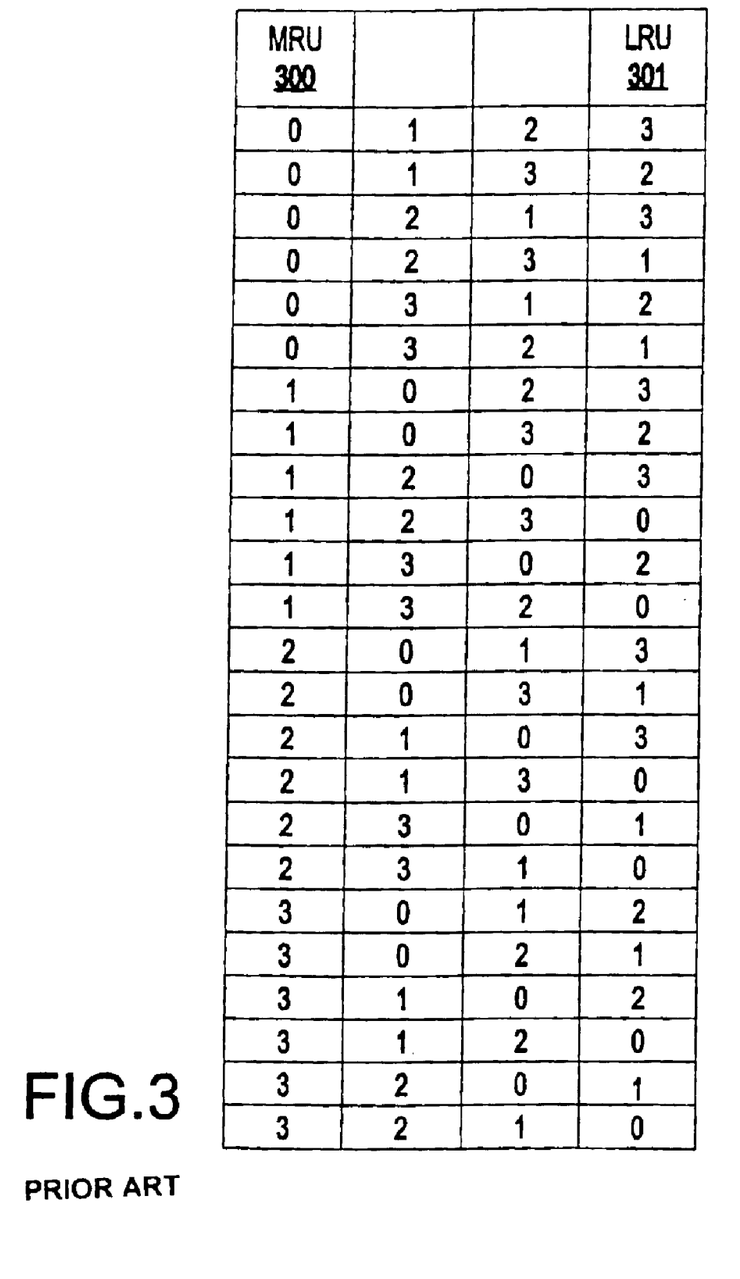
FIG. 3 is a table of all possible LRU states of a prior art four-way set-associative computer cache memory.

The most prevalent algorithm for determining which line to replace in a set-associative cache is called least recently used (LRU). The idea is quite simple, the line to be replaced is selected because it has been least recently used by the processors. Referring to FIG. 3, for a four-way set associative cache where the ways are numbered 0–3, the 24 possible usage states of a cache set are shown with the most recently used (MRU) way 300 on the left proceeding to the LRU way 301 on the right. The set usage state will be referred to as the LRU state. The LRU state is represented by a row in FIG. 3. Based on the way usage pattern of the processors, it is possible to transition from the current LRU state, i.e. a row in FIG. 3, to one of three other possible states. Each time a processor accesses one of the ways of a set, the LRU state is updated. For example, if the LRU state is 0, 1, 2, 3, i.e. row 0 of FIG. 3: if the processor accesses way 1, the next LRU state would be 1, 0, 2, 3, otherwise if the processor accesses way 2 the next LRU state would be 2, 0, 1, 3, otherwise if the processor accesses way 3 the next LRU state would be 3, 0, 1, 2.

Figure 4:
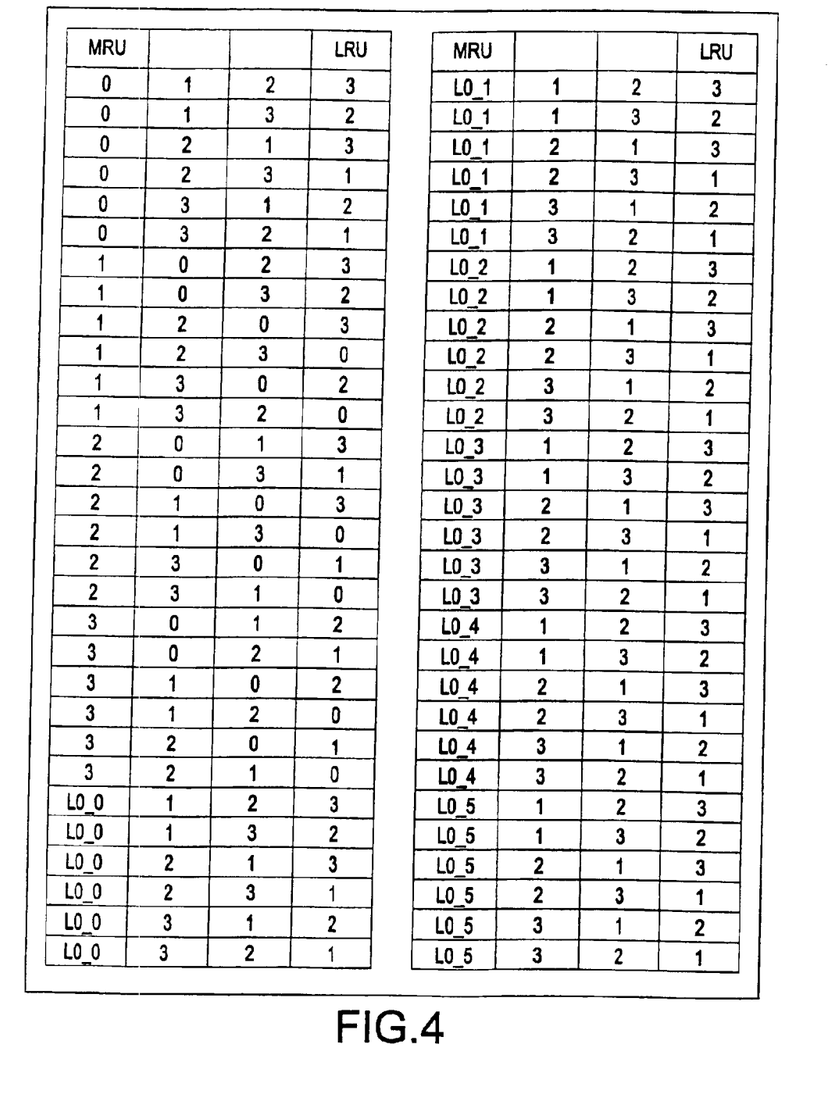
FIG. 4 is a table of enhanced LRU states which provide, as an example, for the temporary locking of way 0 of a set-associative cache.

Referring to FIG. 4 as an example and for illustrative purposes, an improved LRU state table is shown that provides for the temporary locking of way 0 as the MRU of the cache set. Thus, the cache line residing in the temporarily locked way 0 will be (temporarily) pinned. A cache line that is pinned has priority, and will not be selected for replacement when there is a cache miss that maps to the cache set in which the cache line resides. It is possible to devise a system that allows more than one way of a set to be locked in the cache, but for ease of illustration described is a system where only one way can be locked. Since there are 60 states in this improved LRU state table, it will require 6 bits to binary encode the states whereas the state table of FIG. 3 only required 5 bits. The pinning mechanism is handled completely in hardware and will automatically age away as the cache set cycles through line replacements. Each row of FIG. 4 corresponds to an LRU state.

Figure 5:
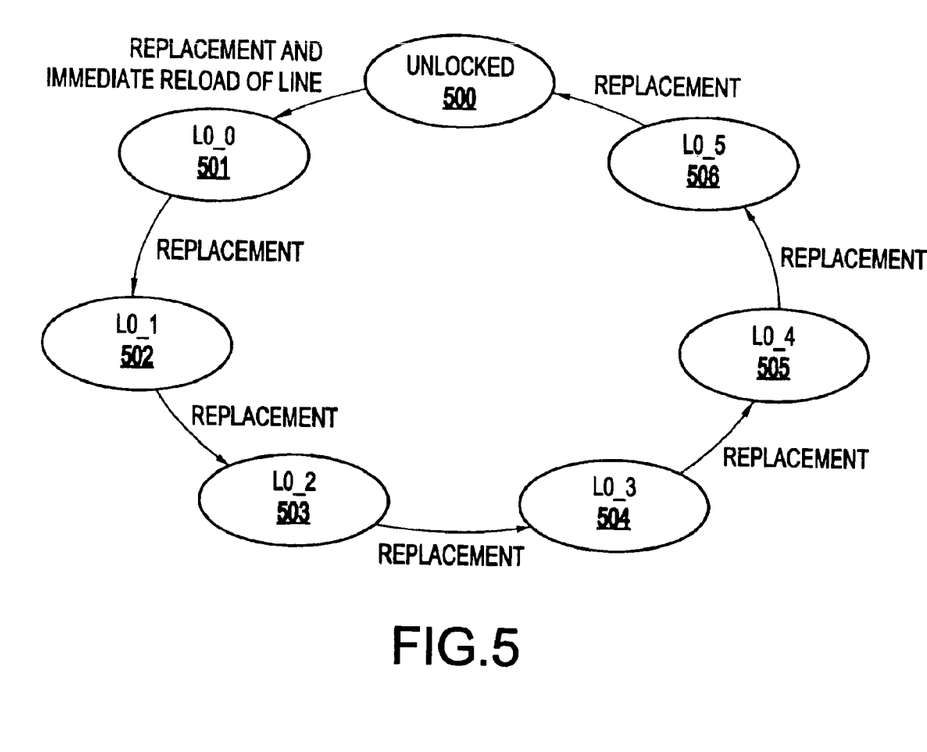
FIG. 5 illustrates an example state transition table of LRU super states for the current invention.

A super state is made up of a super set of LRU states. Referring to FIG. 5, there are a total of seven super states, one of which is the unlocked super state 500, which corresponds to the traditional LRU of FIG. 3, and six locked super states where way 0 is locked as the MRU and are denoted L0_0 through L0_5. The unlocked super state 500 is comprised of the first twenty-four rows of FIG. 4, super state L0_0 501 are the six rows that have L0_0 in the MRU column, super state L0_1 502 are the six rows that have L0_1 in the MRU column etc. State transitions within each of the super states is identical to that of FIG. 3 except way 0 is always forced to be the MRU. State transitions within a super state occur when the set is accessed by a processor, just as in standard LRU. State transitions from one super state to the next super state only occur during a line replacement for the set in question, and not on processor accesses, which serves to help lock the line for a longer duration. It is also possible to increase the duration of a locked way by adding more super states at the cost of requiring more bits for binary encoding. The transitions in the super states, as shown in FIG. 5, are unidirectional in fashion beginning with the unlocked super state 500, then to the first locked super state L0_0 501, then to L0_1 502, up to L0_5 506. When in the L0_5 super state 506 and a line replacement is necessary for the set, a super state transition back to the unlocked super state 500 is made, which means the LRU state will once again behave like traditional LRU i.e. way 0 is no longer locked. The L0_0 super state is entered from the unlocked super state when it is detected that a line that has recently been evicted from the cache is requested by the processor thus causing a line replacement. In an alternative embodiment, transitions between super states could be triggered by cache accesses (both hits and misses) that map to the given set; this would generally result in the line remaining locked for a shorter period of time.

Figure 6:
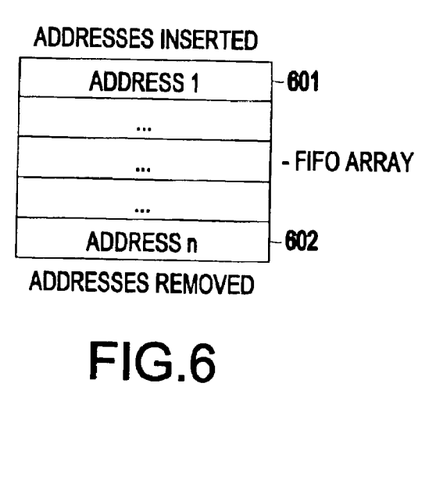
FIG. 6 illustrates a FIFO used to store the addresses of lines recently evicted from the cache.

There are several schemes which can be used to detect when a recently evicted cache line is requested by the processor. One scheme would be to store timestamps indicating when the line was last evicted from the cache. At the start of a cache miss which requires line replacement, the current timestamp would be compared to the timestamp of the line indicating when the line was last evicted. If the difference between the two timestamps is smaller than some delta, the new line is locked by placing it in way 0 and the LRU state transitions to super state L0_0. A preferred method which does not require timestamps to be stored for each line and does not have associated counter overrun problems, is to maintain a small first-in first-out array (FIFO) which contains the addresses of lines recently evicted from the cache, as shown in FIG. 6. When a line is evicted from the cache its address is placed in the FIFO array at the beginning of the array (601) and the oldest address at the end of the FIFO array (602) is removed. At the start of a cache miss which requires line replacement, the address of the line which caused the miss is compared with all the addresses in the FIFO array. If the address is in the FIFO array, the new line would be locked as above. The size of the FIFO array can be adjusted to precisely control how often the locked super states are used.

While the invention has been described in terms of preferred embodiments, those skilled in the art will recognize that the invention can be practiced with modification within the spirit and scope of the appended claims.

Figure 7:
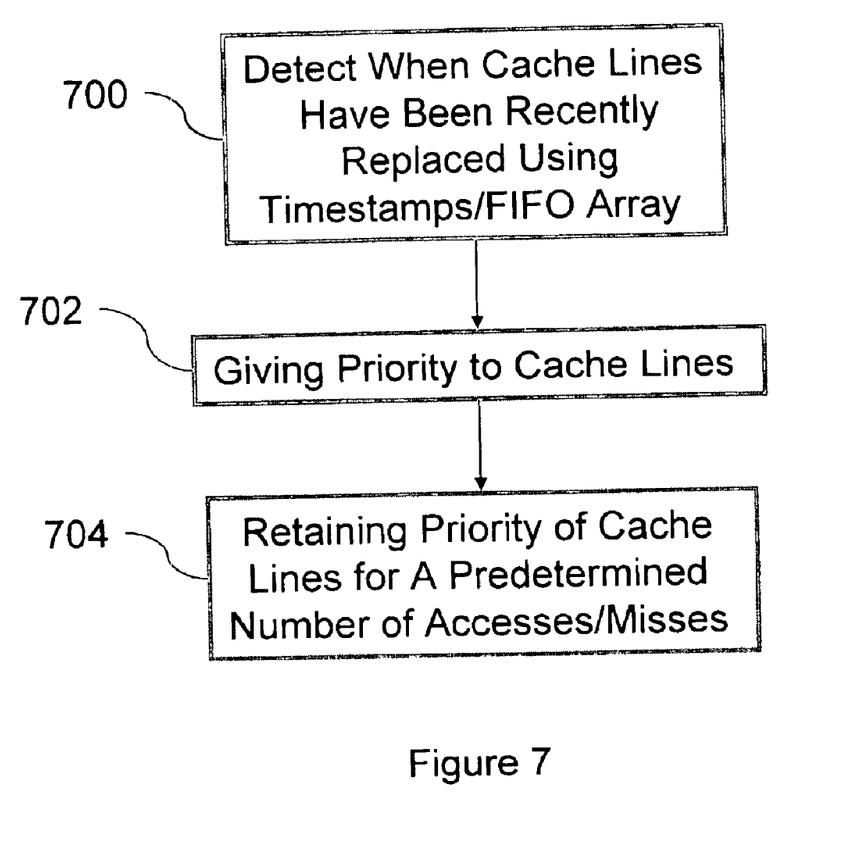

FIG. 7 is a flowchart illustrating aspects of the invention. More specifically, the invention has a method for use in a computer system with a cache memory and a cache memory controller. The method detects when cache lines that have been recently replaced in the cache memory are subsequently reloaded into the cache memory 700 and gives priority to the cache lines by the cache memory controller, so that while the cache lines have priority they are not selected for replacement on cache misses 702. The cache lines that have been recently replaced in the cache memory and then subsequently reloaded are detected by the use of timestamps and are also detected by the use of a FIFO array containing the addresses of recently replaced cache lines 700.

A cache line that has priority retains priority for a predetermined number of accesses to the cache set in which the cache line resides, after which the cache line again becomes eligible for replacement 704. A cache line that has priority also retains priority for a predetermined number of misses to the cache set in which the cache line resides, after which the cache line again becomes eligible for replacement 704.

What is claimed is:

1. A method for use in a computer system with a cache memory and a cache memory controller, said method comprising:

detecting when cache lines that have been recently replaced in said cache memory are subsequently reloaded into said cache memory; and giving priority to said cache lines by said cache memory controller, so that while said cache lines have priority they are locked and cannot be selected for replacement on cache misses.

2. The method in claim 1, further comprising detecting, by the use of timestamps, cache lines that have been recently replaced in said cache memory and then subsequently reloaded.

3. The method in claim 1, further comprising detecting, by the use of a FIFO array containing the addresses of recently replaced cache lines, cache lines that have been recently replaced in said cache memory and then subsequently reloaded.

4. The method in claim 1, wherein a cache line that has priority retains priority for a predetermined number of accesses to the cache set in which the cache line resides, after which the cache line again becomes eligible for replacement.

5. The method in claim 1, wherein a cache line that has priority retains priority for a predetermined number of misses to the cache set in which the cache line resides, after which the cache line again becomes eligible for replacement.

6. A method for use in a computer system having a cache memory and a cache memory controller, said method comprising:

identifying cache lines that are removed from and subsequently reloaded into a cache memory more recently than a predetermined standard as priority cache lines, and locking said priority cache lines to temporarily prevent said priority cache lines from being replaced on cache misses.

7. The method in claim 6, wherein said identifying uses timestamps to determine if said cache lines are replaced more recently than said predetermined standard, and wherein said predetermined standard is a time period.

8. The method in claim 6, wherein said identifying uses a first-in first-out (FIFO) table to determine if said cache lines are replaced more recently than said predetermined standard, and wherein said predetermined standard is a length of said FIFO table.

9. The method in claim 6, wherein a priority cache line retains priority for a predetermined number of accesses to the cache set in which the cache line resides, after which said priority cache line loses priority status and again becomes eligible for replacement.

10. The method in claim 6, wherein a priority cache line retains priority for a predetermined number of misses to the cache set in which the cache line resides, after which said priority cache line loses priority status and again becomes eligible for replacement.

11. A method for use in a computer system having a cache memory and a cache memory controller, said method comprising:

identifying cache lines that are removed from and subsequently reloaded into a cache memory more recently than a predetermined standard as priority cache lines, and locking said priority cache lines to temporarily prevent said priority cache lines from being replaced on cache misses irrespective of a cache miss line replacement process applied to non-locked cache lines.

12. The method in claim 11, wherein said identifying uses timestamps to determine if said cache lines are replaced more recently than said predetermined standard, and wherein said predetermined standard is a time period.

13. The method in claim 11, wherein said identifying uses a first-in first-out (FIFO) table to determine if said cache lines are replaced more recently than said predetermined standard, and wherein said predetermined standard is a length of said FIFO table.

14. The method in claim 11, wherein a priority cache line retains priority for a predetermined number of accesses to the cache set in which the cache line resides, after which said priority cache line loses priority status and again becomes eligible for replacement.

15. The method in claim 11, wherein a priority cache line retains priority for a predetermined number of misses to the cache set in which the cache line resides, after which said priority cache line loses priority status and again becomes eligible for replacement.

16. A program storage device readable by machine, tangibly embodying a program of instructions executable by the machine to perform a method comprising:

identifying cache lines that are removed from and subsequently reloaded into a cache memory more recently than a predetermined standard as priority cache lines, and locking said priority cache lines to temporarily prevent said priority cache lines from being replaced on cache misses.

17. The program storage device in claim 16, wherein said identifying uses timestamps to determine if said cache lines are replaced more recently than said predetermined standard, and wherein said predetermined standard is a time period.

18. The program storage device in claim 16, wherein said identifying uses a first-in first-out (FIFO) table to determine if said cache lines are replaced more recently than said predetermined standard, and wherein said predetermined standard is a length of said FIFO table.

19. The program storage device in claim 16, wherein a priority cache line retains priority for a predetermined number of accesses to the cache set in which the cache line resides, after which said priority cache line loses priority status and again becomes eligible for replacement.

20. The program storage device in claim 16, wherein a priority cache line retains priority for a predetermined number of misses to the cache set in which the cache line resides, after which said priority cache line loses priority status and again becomes eligible for replacement.

* * * * *